United States Patent [19]

Arbeiter et al.

[11] Patent Number: 5,588,925

[45] Date of Patent: Dec. 31, 1996

[54] SHIFTER FOR TRANSMISSIONS ON BICYCLES

[75] Inventors: Markus Arbeiter, Würzburg; Christian Weishaupt, Schwebheim, both of Germany

[73] Assignee: Fichtel & Sachs AG, Schweinfurt, Germany

[21] Appl. No.: 563,996

[22] Filed: Nov. 29, 1995

[30] Foreign Application Priority Data

Dec. 2, 1994 [DE] Germany .......................... 44 42 952.5

[51] Int. Cl.[6] ................................................. F16H 59/00
[52] U.S. Cl. ............................ 474/81; 474/128; 74/502.2
[58] Field of Search ............................... 474/128, 80–82, 474/78, 70; 74/502.2

[56] References Cited

U.S. PATENT DOCUMENTS 5,102,372   4/1992   Paterson et al. ........................ 474/80
5,197,927   3/1993   Patterson et al. ....................... 474/80

FOREIGN PATENT DOCUMENTS 2657062   7/1991   France .
2817627   11/1978   Germany .

*Primary Examiner*—Roger J. Schoeppel
*Attorney, Agent, or Firm*—Nils H. Ljungman and Associates

[57] ABSTRACT

This invention relates to a shifter for the actuation of derailleurs on bicycles with an integrated transition distance for shifting the chain from a smaller sprocket to the next larger sprocket by means of a detent element. The detent element interacts with a detent spring which detent spring is permanently fastened to the housing. The return of the shifting system into the correct position of the derailleur over the desired larger sprocket is no longer left exclusively to the return spring of the derailleur by means of a Bowden cable, but is assisted by a transition spring which is coupled to the detent spring in the shifter.

8 Claims, 11 Drawing Sheets

5,588,925

SHIFTER FOR TRANSMISSIONS ON BICYCLES

BACKGROUND OF THE INVENTION

1. Field of the Invention

The present invention generally relates to a shifter for the actuation of a derailleur on bicycles. The shifter for a derailleur for bicycles comprises a housing, a detent element which is connected both to the manual actuator and to the derailleur, as well as a detent spring made of elastic plastic material, the lug of which interacts with detents of the detent element and can have a transition distance between the housing and the detent spring.

2. Background Information

French Patent No. 2 657 062 discloses a shifter for derailleurs which has a rotating ring 44 with a cable suspension 43 and grip ends 50 as well as a housing 22 fastened to the handlebar with notches for a spring ring 28 which interacts by means of lugs 26 with notches 46 in the rotating ring 44. This spring ring 28 is realized in one piece as shown in FIG. 2 and in two parts as shown in FIG. 4, whereby one of the parts is the detent spring 29, which can be rotated by a small circular distance relative to the second ring part 29'. This relative rotational capability, as disclosed in claim 6, makes it possible to increase the shifting travel from one detent to the next, against the spring force of the derailleur, by just this small relative rotation, whereby a transition travel is produced which, when the chain is shifted from a smaller sprocket to the next larger sprocket, can be used as before to significantly improve the shifting quality.

An improvement could be made by introducing a transition spring which would be installed as a compression spring in the transition space between the detent spring and the second ring part or the housing. The advantage would lie in a defined position of the detent spring in the idle position of the shifting system and in the precision of shifting which could be achieved after shifting from the smaller to the next larger sprocket by the momentary neutralization of the transitional condition.

OBJECT OF THE INVENTION

The object of the invention is therefore to create a device which makes it possible, immediately after the completion of the shifting actuation, to end the transitional state and to return the derailleur to its correct position above the selected sprocket.

SUMMARY OF THE INVENTION

The present invention teaches that this object can be accomplished by means of the detent spring located in a recess of the housing, whereby also located in the recess, in addition to the detent spring, located downstream in the direction of movement, is a transition spring which can apply a bias between the housing and the detent spring and can be compressed into a block. The spring travel of the transition spring can correspond to the specified transition distance on the derailleur. The transition spring can be connected in one piece with the detent spring. The detent spring can have a stop which limits the transition distance by interaction with the transition spring. The transition spring can be realized in the form of a plate spring. The transition spring also can be realized in the form of a coil spring. The transition spring can be connected in one piece with the detent spring, and can apply a bias between the housing and the detent spring. The detent spring can be made of steel band material.

The above discussed embodiments of the present invention will be described further hereinbelow with reference to the accompanying figures. When the word "invention" is used in this specification, the word "invention" includes "inventions", that is, the plural of "invention". By stating "invention", the Applicant(s) does/do not in any way admit that the present application does not include more than one patentably and non-obviously distinct invention, and maintains that this application may include more than one patentably and non-obviously distinct invention. The Applicant(s) hereby assert(s) that the disclosure of this application may include more than one invention, and, in the event that there is more than one invention, that these inventions may be patentable and non-obvious one with respect to the other.

BRIEF DESCRIPTION OF THE DRAWINGS

The present invention is explained below with reference to the accompanying drawings, in which:

FIG. 10b shows a variant of the twist grip shifter shown in FIGS. 10 and 10a;

DESCRIPTION OF THE PREFERRED EMBODIMENT

Figure 1:
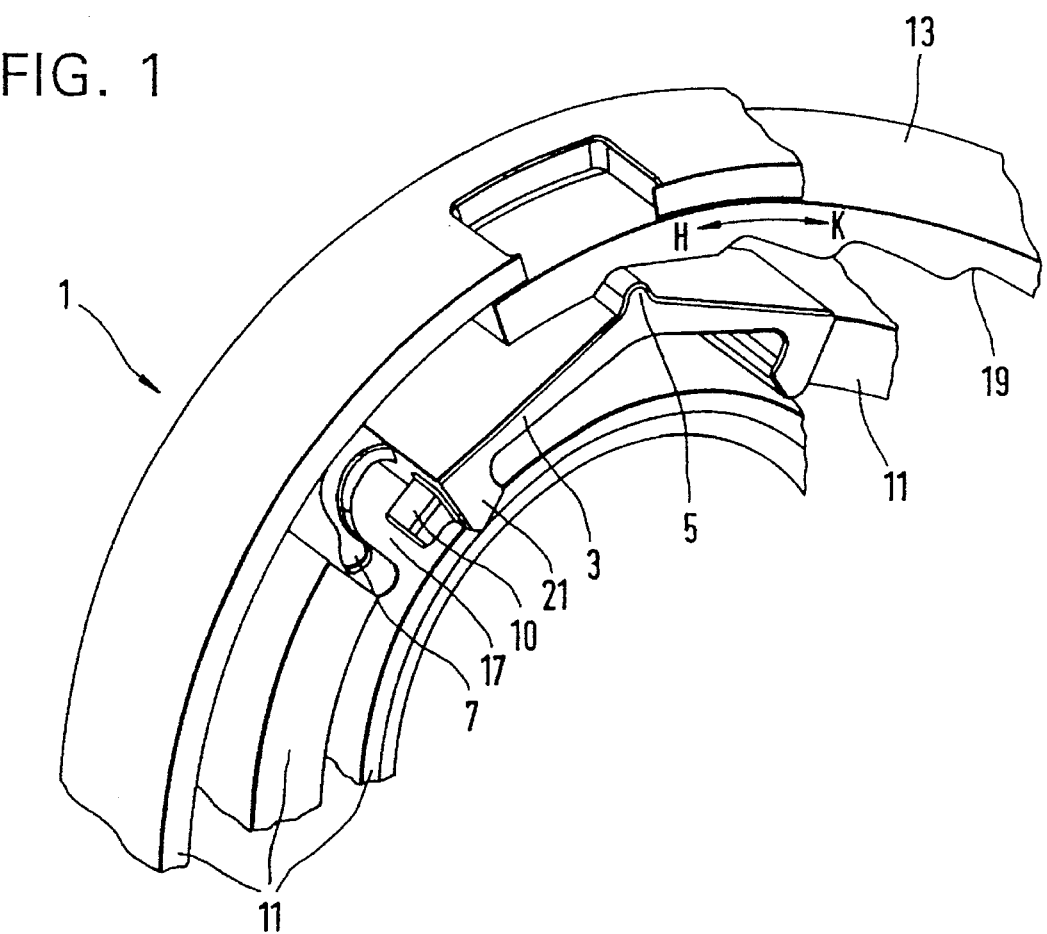
FIG. 1 shows a view in perspective of a shifter with a housing, a detent element and a detent spring with a transition spring.

One embodiment of the present invention, as shown in FIG. 1, includes a latching or detent shifter for the actuation of a derailleur K. This detent shifter consists of a housing 11 which can be permanently connected or connected in a non-rotational manner to a part of a bicycle, a detent element 13 which is movably located inside this housing 11 and which is connected, possibly by means of a cable, on one hand to a manual actuator (designated H for direction indication in the figure) and on the other hand to the derailleur(designated K for direction indication in the figure) to be shifted to change the gear on the bicycle. The embodiment illustrated in FIG. 1 shows a twist-grip shifter located around a handlebar, the manual actuator H which is connected to the detent element 13. The detent element 13 is also connected to the first end of a control cable of a Bowden cable, while the second end of the control cable is connected to the derailleur K (see FIG. 2). The detent element 13 has detents 19 in which a lug 5 of a detent spring 3 is engaged. In this case, the detent spring 3 is in a stirrup-shape, and is supported by means of two projections 21 on the housing 11, by means of which the lug 5 is biased with respect to the detent element 13.

Figure 3:
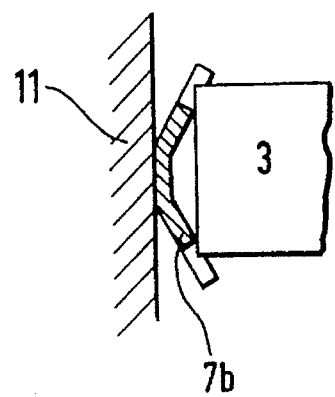
FIG. 3 illustrates a variant in which the transition spring is realized in the form of a plate spring.
Figure 4:
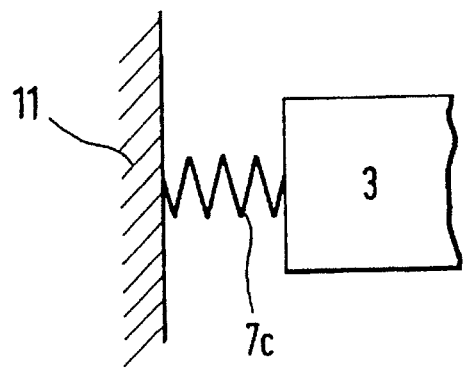
FIG. 4 illustrates an additional variant of the transition spring, in which it is realized in the form of a coil spring.

The detent spring 3 lies in a recess in a circumferential portion in the housing 11 (see FIG. 6), by means of which the detent spring 3 is fixed in position in the circumferential direction. This fixing includes some additional play, namely the transition distance 17, within which the detent spring 3 can move back and forth in the circumferential direction. To orient the detent spring 3 on a particular side, namely on the side facing the manual actuator H, there is a transition spring 7 which can preferably be connected in one piece with the detent spring 3, but which transition spring 7 can also be in the form of a spring plate 7b (FIG. 3), or as a separate transition spring in the form of a coil spring 7c (FIG. 4). There can also be a stop 10 which correctly limits the travel of the transition spring 7 and defines the transition distance 17.

Figure 5:
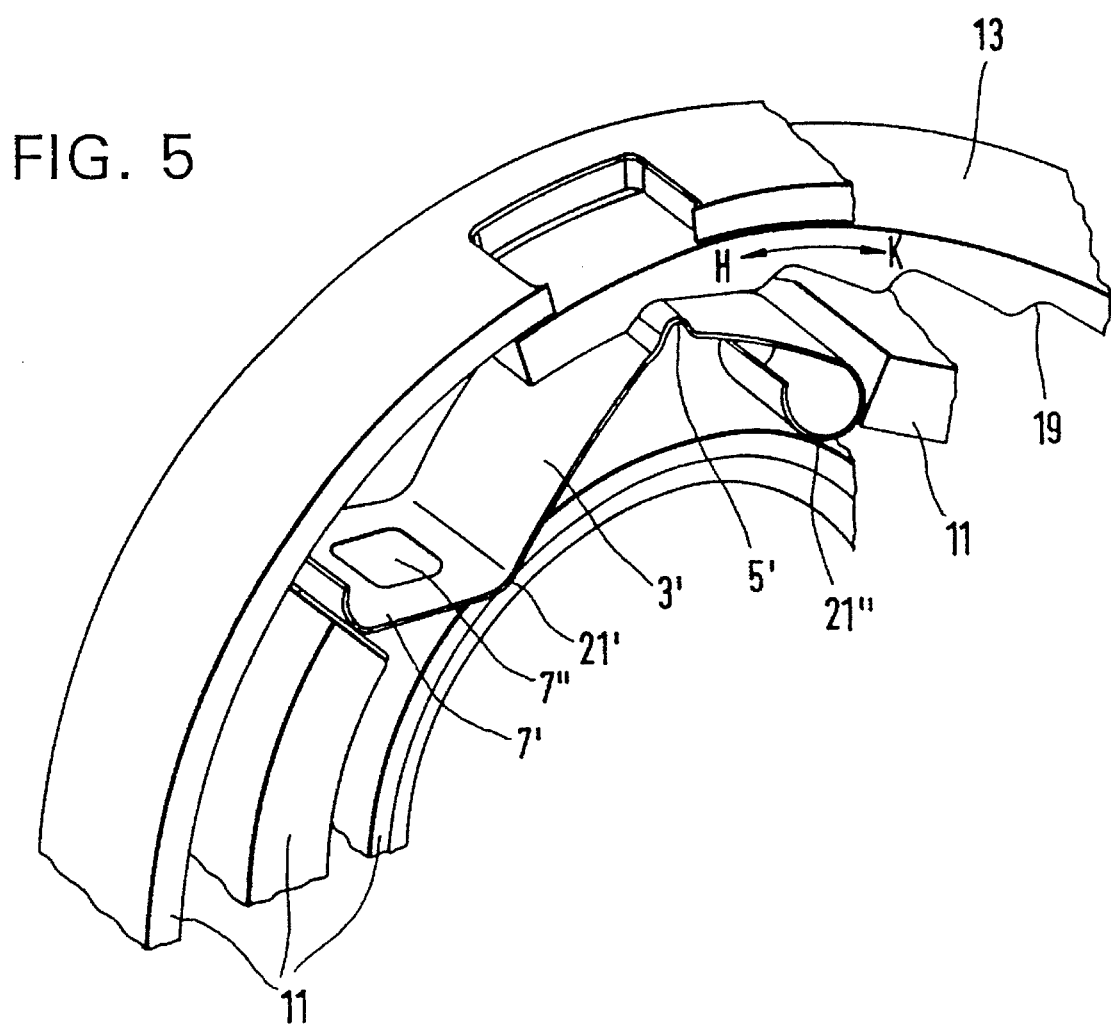
FIG. 5 shows a view in perspective as in FIG. 1 with a detent spring made of steel band material and an integrated transition spring.

FIG. 5 shows a detent spring 3' which is also in the shape of a stirrup and includes a leaf spring made of steel band material. This detent spring 3' also has a lug 5' to increase a retaining force with respect to the detents 19 in the detent element 13, which force results from a bias which is generated by two projections 21' and 21", which projections 21' and 21" are supported on the housing 11. At the projection 21', the detent spring 3' can be connected in one piece to a transition spring 7', which transition spring 7' can be applied against the flank on the housing 11. To increase the flexibility of the transition spring 7', notches 7" can be created which reduce the thickness of the band material in certain places and make possible a softer spring constant than the regular thickness of the band material of which the detent spring 3' is made.

Figure 2:
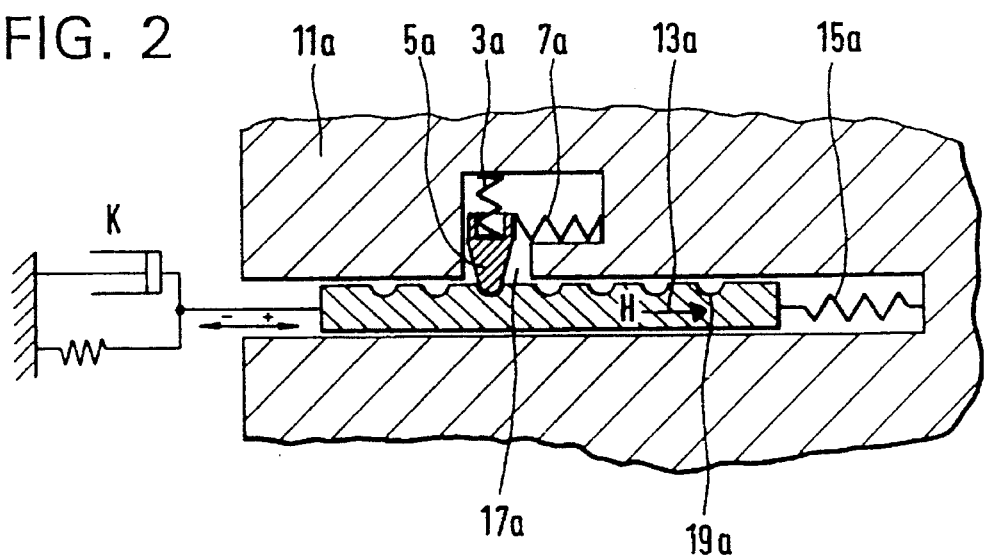
FIG. 2 shows a schematic illustration of the elements which participate in the shifting action.

FIG. 2 is a schematic diagram which illustrates the function of the detent shifter 1. By analogy to FIG. 1, the parts shown in FIG. 2 are identified by the same numbers plus the letter "a".

If the detent element 13a in the housing 11a is pulled by the manual actuator H toward the manual actuator H, the chain is to be shifted from a smaller sprocket to the next larger sprocket. On account of the lower tendency of the chain to ascend in this direction of shifting, the desired position of the derailleur K is overshot by the transition distance 17a, as a result of which the angle of ascent of the chain with respect to the larger sprocket increases and the shifting takes place. With the current quality of the shifting elements of derailleurs, it is sufficient to hold this transition position only for a very brief time, which means that the user need only shift to the next resistance, and then let go. Without noticing or even intending to do so, the rider has used the transition distance 17a.

As shown in FIG. 2, the detent element 13a can be connected to the housing 11a by means of a compensation spring 15a, which has the advantage that the shifting motion toward the next larger sprocket is made easier, since the compensation spring 15a, acting as a tension spring, counteracts the spring force of the parallelogram of the derailleur K. Also, the compensation spring 15a can be eliminated, since the process of shifting between the detent element 13a and the detent spring 3a is not directly affected. If the detent element 13a is then moved further toward the manual actuator H, first the transition spring 7a is pressed together by the detent lug 5a and the transition distance 17a is reduced by the detent lug 5a to the detent spring 3a. Essentially only then does the detent lug 5a jump out of the respective detent 19a and slide into the next detent 19a, whereby the position of the detent lug 5a on the detent spring 3a does not change. Only after the manual actuator H is released does the transition spring 7a, in connection with the return spring in the derailleur K, bring the detent element 13a back into the desired correct shifting position.

In other words, in accordance with one embodiment of the present invention, when the manual actuator H pulls the detent element 13a, the detent lug 5a compresses the transition spring 7a. When the detent lug 5a fully reduces the transition distance 17a, the detent lug 5a rises out of the current detent 19a and slides into the next detent 19a. The rising of detent lug 5a compresses the detent spring 3a. The force of the detent spring 3a pushes the detent lug 5a into the next detent 19a. After the manual actuator H is released, the force of the transition spring 7a, along with effect of the return spring in the derailleur K, brings the detent element 13a back into the desired correct position wherein the derailleur K is aligned with the chain over the newly selected gear.

One feature of the invention resides broadly in the shifter for a derailleur for bicycles, comprising a housing 11, a detent element 13 which is connected both to the manual actuator H and to the derailleur K, as well as a detent spring 3 made of elastic plastic material, the lug 5 of which interacts with detents 19 of the detent element 13 and can have a transition distance 17 between the housing 11 and the detent spring 3, characterized by the fact that the detent spring 3 is located in a recess of the housing 11, whereby also located in the recess, in addition to the detent spring 3, located downstream in the direction of movement toward the manual actuator H, is a transition spring 7 which can apply a bias between the housing 11 and the detent spring 3 and can be compressed into a block.

Another feature of the invention resides broadly in the shifter characterized by the fact that the spring travel of the transition spring 7 corresponds to the specified transition distance on the derailleur K.

Yet another feature of the invention resides broadly in the shifter characterized by the fact that the transition spring 7 is connected in one piece with the detent spring 3.

Still another feature of the invention resides broadly in the shifter characterized by the fact that the detent spring 3 has a stop 10 which limits the transition distance 17 by interaction with the transition spring 7.

A further feature of the invention resides broadly in the shifter characterized by the fact that the transition spring 7b is realized in the form of a plate spring.

Another feature of the invention resides broadly in the shifter characterized by the fact that the transition spring 7c is realized in the form of a coil spring.

Yet another feature of the invention resides broadly in the shifter for a derailleur for bicycles, comprising a housing 11, a detent element 13 which is connected both to the manual actuator H and to the derailleur K, as well as a detent spring 3', the lug 5' of which interacts with detents 19 of the detent element 13 and can have a transition distance 17 between the housing 11 and the detent spring 3', characterized by the fact that the detent spring 3' is located in a recess of the housing 11, whereby also located in the recess, downstream of the detent spring 3' in the direction of movement toward the manual actuator, there is a transition spring 7' which is connected in one piece with the detent spring 3', and which can apply a bias between the housing 11 and the detent spring 3'.

Still another feature of the invention resides broadly in the shifter characterized by the fact that the detent spring 3 is made of steel band material.

An invention generally relates to a twist grip shifter for a bicycle transmission. The twist grip shifter can be a latching shifter for the actuation of bicycle transmissions, such as hub transmissions or derailleurs. The latching shifter includes a housing and a latching element, which latching element has notches. The latching shifter further includes a latching spring, which latching spring has at least one latching lug. The latching spring also has two projections, which projections are located opposite the latching lug, viewed in the direction of the transmission of force. The latching shifter includes a recess for the latching spring and stop surfaces located on the housing.

Figure 6:
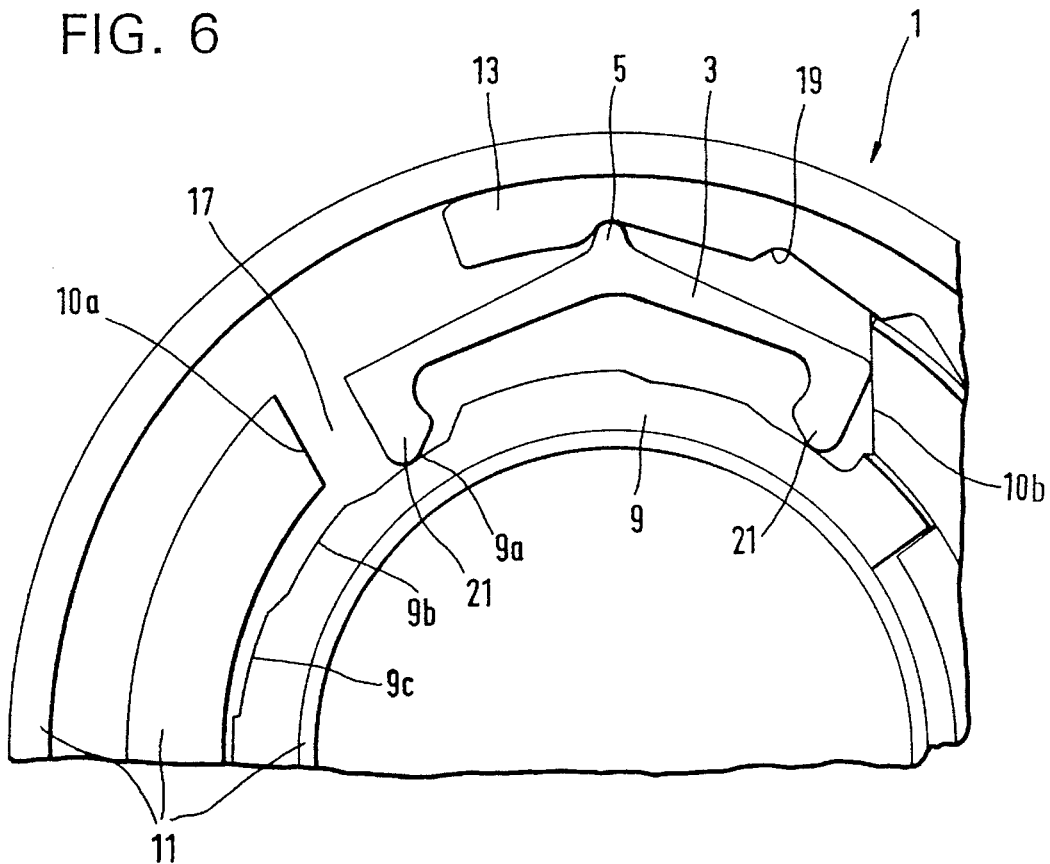
FIG. 6 shows a portion of a latching shifter with a housing, a latching element, a latching spring and a slide, with several bias stages.
Figure 7:
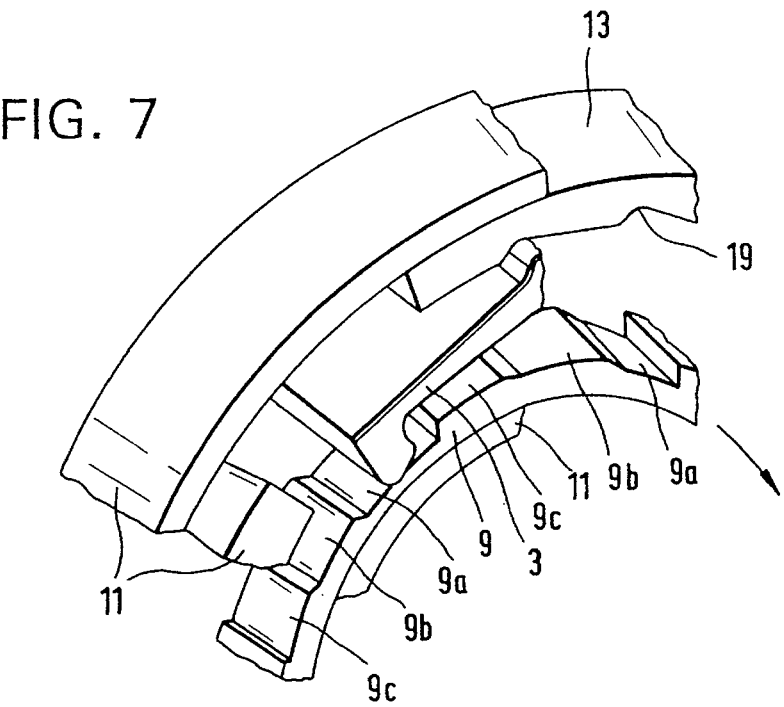
FIG. 7 shows a view in perspective of the portion of the latching shifter illustrated in FIG. 6, with a more detailed illustration of the slide.

French Patent No. 25 40 818 discloses a latching shifter which, as shown in that publication's FIG. 7, has a biased latching spring with a latching lug which is engaged with bias in a profile of the latching element. This bias is constant and is a function of the level of the recess in the housing of this shifter in which the latching spring rests to generate the bias by means of two clip-like or bracket-like ends. The arrangement operates, as shown in the publication's FIGS. 6 or 9, to generate sound, whereby in this case, the bias is constant.

An object of an invention, in particular, with twist grip shifters, is to advantageously increase or decrease the latching of the latching spring with the latching element by increasing or decreasing the bias. The rider can thereby individually select a shifting force which can be to suit the rider's own requirements regarding the relationship between the shifting force which must be exerted and the retention force of the latching. Unintentional shifts can be prevented, if the rider can adjust the retention force of the latching of the latching shifter so that the manual actuator on the latching shifter can stop rotating just as it enters the new gear.

An object of an invention is, therefore, to create a shifter for bicycle transmissions, the latching of which shifter, in relation to the retention force of the shifter, can be individually adjusted by modifying the bias of the parts which are to be latched with one another.

The object can be achieved by designing the latching spring to interact with a slide or bar, to generate a bias of the latching lug in the notches of the latching element. The two projections can thereby be biased at different levels by selectively changing the position of the slide from a first bias area, which first bias area can include a first level, or to a second bias area, which second bias area can include a second level, or to a third bias area, which third bias area can include a third level, etc.

In accordance with an embodiment of an invention, the bias areas can be designed, in terms of the width of the bias areas, such that a displacement of the latching spring can be possible by the order of magnitude of a transition distance. The transition distance can be specified by the latching spring and a stop surface essentially without changing the level.

In accordance with another embodiment of an invention, the slide can permit a continuous change of the level of the projections by means of an inclined plane, which inclined plane can correspond to each of the bias areas.

One embodiment of an invention, as shown in FIG. 6, includes a detent or latching shifter 1 which can be, in particular, a twist grip shifter for the actuation of bicycle transmissions, such as hub transmissions or derailleurs. The latching shifter 1 can include a housing 11 and a detent or latching element 13, which latching element 13 can have detents or notches 19. The latching shifter 1 can also include a detent or latching spring 3. The latching spring 3 can preferably include a detent or latching lug 5 and two projections 21. The latching spring 3 can also have a slide 9 with various bias stages 9a, 9b, 9c etc. The bias stages 9a, 9b, 9c etc. can interact with the projections 21 of the latching spring 3.

The housing 11 can preferably be non-rotationally connected to the handlebar of the bicycle in the vicinity of the grip part. On the orbit of the latching spring 3, there can preferably be a recess, which recess can be formed by the stop surfaces 10a and 10b. In other words, there is a recess in a circumferential portion of the housing that is limited on one end by stop surface 10a and on the other end by stop surface 10b. The latching spring 3 can be located in this recess. The latching spring 3 can be in contact with the one stop surface 10a by means of the spring force generated by the bicycle transmission. Between the latching spring 3 and the other stop surface 10b, there can be a clearance, which clearance can represent a transition distance 17, whereby the position of the latching spring 3 in its rest position can be defined.

In accordance with one embodiment of an invention, therefore, the housing 11 can preferably be attached to the handlebar such that the housing 11 cannot rotate with respect to the area of the grip part of the handlebar. The latching spring 3 can preferably be located within the recess, which recess can include a space essentially between the stop surface 10a and the stop surface 10b. The latching spring 3 can orbit or move within this recess. One side of the latching spring 3 can preferably be biased against the stop surface 10b. The other end of the latching spring 3, which other end can face away from the stop surface 10b, can face toward the stop surface 10a. The transition distance 17 can thereby include the space or clearance between the end of the latching spring 3 and the stop surface 10a. The amount of clearance of the transition distance 17 can remain essentially constant when the latching spring 3 is in a rest position.

The recess in the housing 11 can be crossed or overrun by the latching element 13, which latching element 13 can preferably be connected to the rotational portion of the twist grip shifter. The latching element 13 can have several notches 19 facing the latching lug 5, as mentioned above, whereby a latching can occur when the latching lug 5 is essentially pressed with bias into the notches 19. This bias can be generated by the latching spring 3, which latching spring 3 can rest, by means of the two projections 21, on the slide 9. The slide 9 has the different bias stages 9a, 9b, 9c etc., each of which bias stages 9a, 9b, 9c etc. can lie on a different level with regard to the projections 21. The bias stages 9a, 9b, 9c etc. can be displaced in pairs, one after another, under the two projections 21, by changing the position of the slide 9.

Therefore, in accordance with one embodiment of an invention, the latching element 13 can be located along the outer portion of the recess, with reference to FIG. 6. The latching element 13 can rotate with respect to the rotational portion of the twist grip shifter. The latching element 13 can have several notches 19, which notches 19 can receive the latching lug 5 to thereby bias the latching spring 3 essentially between the latching element 13 and the slide 9. The latching spring 3 can include a pair of projections 21. The two projections 21 can simultaneously be displaced back and forth among the different bias stages 9a, 9b, and 9c etc. of the slide 9 by means of the rotation of the slide 9 in a clockwise or a counterclockwise direction with respect to FIG. 6.

In the position illustrated in FIGS. 6 and 7, the projections 21 of the latching spring 3 can each be considered to be on the bias stages 9a of the slide 9. In this position, the least bias is applied to the latching spring 3, which means that the latching element 13 can be pushed or pulled most easily from the retention position in the notch 19. If the slide 9 is rotated in the clockwise direction with respect to FIGS. 6 and 7, the projections 21 can be moved to the higher level of the subsequent bias stage 9b. As a result, the latching spring 3 can be essentially more strongly biased by the difference in level between the bias stages 9a and 9b, with the result that the latching spring 3 can develop a higher resistance against a rotational force. The retention force of the latching spring 3, when the bias stage 9c is subsequently moved under the projections 21 of the latching spring 3, can change accordingly.

Therefore, in accordance with one embodiment of an invention, when the two projections 21 are on the respective bias stages 9a, as shown in FIGS. 6 and 7, the least amount of biasing force can be applied to the latching spring 3. When the slide 9 is rotated in the clockwise direction, however, the two projections 21 can be biased against the respective bias stages 9b. As a result, because of the difference of levels between bias stages 9a and bias stages 9b, the latching spring 3 can thereby be more strongly biased between the latching element 13 and the slide 9. Similarly, when the slide 9 is further rotated in the clockwise direction, the two projections 21 can be biased against the respective bias stages 9c. As a result, because of the difference of levels between bias stages 9b and bias stages 9c, the latching spring 3 can thereby be even more strongly biased between the ,latching element 13 and the slide 9. When the rotation of the slide 9 successively displaces the two projections 21 from the biasing stages 9a, to the biasing stages 9b, and then to the biasing stages 9c, etc., the bias of the latching spring 3 between the latching element 13 and the slide 9 can accordingly provide a greater resistance to the force of rotation.

The bias stages 9a, 9b, 9c etc. can be selected so that the peripheral extensions of each of the bias stages 9a, 9b, 9c etc. can be large enough that the latching spring 3 can be displaced by the peripheral length of the transition distance 17, without the projections 21 leaving the respective bias stage 9a or 9b or 9c etc. In other words, the circumferential length of the bias stages 9a, 9b, and 9c can be at least the length of the transition distance 17. Therefore, the latching spring 3 can move throughout the transition distance 17 without the projections 21 being displaced to another of the bias stages.

In summary, and in accordance with one embodiment of an invention, to essentially prevent the projections 21 from being displaced from the corresponding bias stages 9a, 9b, or 9c etc., the length of each of the bias stages 9a, 9b, and 9c etc. can be sized with respect to the length of the transition distance 17 such that the length of the bias stages 9a, 9b, and 9c etc. can preferably be relatively longer than the length of the transition distance 17. As a result, if the latching spring 3 essentially travels toward and along the transition distance 17, the projections 21 of the latching spring 3 can be prevented from leaving the corresponding pair of biasing stages 9a, 9b, or 9c etc. because the longer lengths of each of the biasing stages 9a, 9b, and 9c etc. can thereby compensate for the travel of the latching spring 3 along the shorter length of the transition distance 17.

Figure 8:
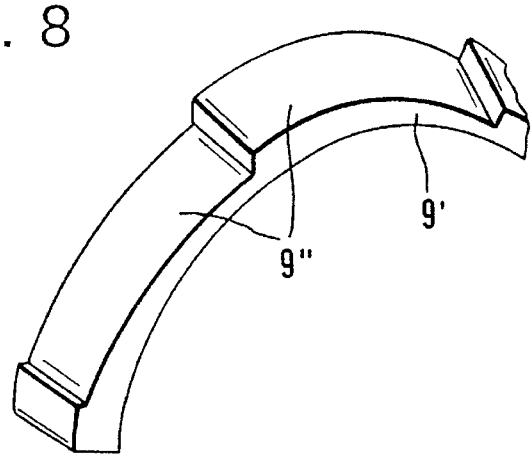
FIG. 8 shows a variant of the slide with the capability of continuously adjusting the bias of the latching spring.

FIG. 8 shows a slide 9' with contact surfaces 9", which contact surfaces 9" no longer include different bias stages. Each of the contact surfaces 9" can, however, include an inclined plane with a low angle of inclination, which has the special advantage that it can permit a continuous adjustment of the bias between the latching spring 3 and the latching element 13.

Therefore, in accordance with one embodiment of an invention, as shown in FIG. 8, each contact surface 9" of the slide 9' can include an arc-shaped or inclined surface. As a result, the height of one end of the contact surface 9" can be relatively shorter than the height of the other end of the contact surface 9" such that the height of the areas between the ends can thereby form an inclined plane of the contact surface 9". By realizing the contact surface 9" in the form of an arc-shaped or inclined plane, the bias of the latching spring 3 can be essentially continuously adjusted upon rotation of the slide 9'.

In general, with regard to the mode of operation of the latching shifter 1, it should be understood that the shifting motions can take place essentially exclusively by means of the latching element 13, since the latching element 13 can be connected on one hand directly to the twist grip, which twist grip can be actuated by the rider. And, on the other hand, the latching element 13 can be connected with the one end of a control wire of a Bowden cable, and the other end of the Bowden cable can be located on the adjustment mechanism of the derailleur, in which case the mechanism described here can change only the shifting resistance, in the order of the gears selected, with the ability to produce a stop in each gear, after the latching of the latching lug 5 in one of the notches 19 with the selective bias.

In accordance with one embodiment of an invention, therefore, the latching shifter 1 can operate by means of the motion of the latching element 13 since one end of the latching element 13 can be connected to the twist grip actuated by the rider. The latching element 13 can also be connected with one end of the Bowden cable, whereby the other end of the Bowden cable can preferably be connected to the derailleur to thereby adjust the shift resistance of the gears of the derailleur, In accordance with one embodiment of an invention, one feature of an invention resides broadly in the latching or notching shifter 1 for a bicycle transmission, comprising a housing 11, a latching element 13 with notches 19, a latching spring 3 with at least one latching lug 5, two projections 21 which are located opposite the latching lug 5, viewed in the direction of the transmission of force, and a recess for the latching spring 3 with stop surfaces 10a and 10b on the housing 11, characterized by the fact that the latching spring 3 interacts with a slide 9 to generate a bias of the latching lug 5 in the notches 19 of the latching element 13, whereby each of the two projections 21 can be biased at different levels by selectively changing the position of the slide 9 from a first bias area 9a with a first level, or a second bias area 9b with a second level, or a third bias area 9c with a third level, etc.

In accordance with one embodiment of an invention, another feature of an invention resides broadly in the latching shifter characterized by the fact that the bias areas 9a, 9b, 9c etc. are designed in terms of their width so that a displacement of the latching spring 3 is possible by the order of magnitude of a transition distance 17 specified by the latching spring 3 and stop surface 10b without changing the level.

In accordance with one embodiment of an invention, yet another feature of an invention resides broadly in the latching shifter characterized by the fact that the slide 9' makes possible a continuous change of the level of the projections 21 by means of an inclined plane which corresponds to each of the bias areas 9a, 9b, 9c etc.

An invention generally relates to a twist grip shifter for the control of the gears of transmissions of bicycles. The twist grip shifter includes a connection for an actuator cable, a cable inlet segment, and a winding drum in a cable windup or spooling segment. The twist grip shifter further includes a grip part fixed to the handlebar and another grip part rotationally connected to the winding drum.

German Laid Open Patent Application No. 32 15 427 discloses a twist grip shifter which has a grip part fixed to the handlebar and a rotational grip part, the diameter of which rotational grip part is significantly larger than the diameter of the grip part which is fixed to the handlebar, thereby making it possible for the rider to control the shifting of the gears with little expenditure of effort. To shift gears, the bicyclist must use the large diameter of the rotating part of the grip to shift gears, both when upshifting and when downshifting. When upshifting, in most cases the cable is only released, which means that large shifting forces are not necessary. But when downshifting and when a traction force must be exerted on the cable, different amounts of force are necessary, since the cable must be pulled against the force of a return spring in the transmission of the bicycle. Conventional related devices effectively solve the problem of pulling the cable against the action of the transmission spring, but there is generally no teaching on the release of the cable.

An invention can improve the conventional design. To release the cable, an additional area with a small diameter can preferably be molded onto the rotating part of the grip. The diameter of the rotating part of the grip can thereby essentially differ only slightly from the diameter of the part of the grip that can be fixed to the handlebar. Such a stepped realization of the rotating part of the grip can therefore permit the actuation of the cable, which cable can extend to the bicycle transmission, with relatively little expenditure of effort in both directions. The release of the cable can thereby take place by using the area with the small diameter, and the cable can be reeled in by means of the area of the rotational part of the grip with the large diameter.

The object is to create a twist grip shifter by means of which it is possible to reel in the cable and to overcome relatively high actuation forces by means of an area with a large diameter, and the release of the cable can take place by means of an area with a small diameter, whereby it can be possible to achieve precisely the combination of advantages described above.

This object can be accomplished by designing the contour of a rotational grip part in a stepped fashion such that the rotational grip part can have an area with a large diameter and an area with a small diameter. The area with the large diameter can preferably be located adjacent to a cable windup segment and the area with the small diameter can preferably be directed toward a grip part, which grip part can be fixed to the handlebar. In addition, the area with the small diameter can have a diameter which differs only slightly from that of the grip part.

In accordance with one embodiment, the surface of the non-rotational or fixed grip part can have a first, nondirectionally-structured surface profile for the purpose of ventilation.

In yet another embodiment, the surface of the rotational grip part can preferably have a directional surface profile both in the vicinity of the large diameter and in the vicinity of the small diameter for the transmission of torque.

The area with the small diameter of the rotational grip part can vary slightly, resulting in a rotationally symmetrical shape which can be different from a cylindrical shape.

In an additional advantageous feature, the rotational grip part can have a conical shape in the vicinity of the small diameter. The rotational grip part can have its smallest diameter at the point of transition from the area with the small diameter to the area with the large diameter.

In another embodiment, at the end of the handlebar, the grip part fixed to the handlebar can have a ring-shaped bead. The shape of the ring-shaped bead can preferably be identical, in terms of diameter, shape and surface structure, to the area of the rotational grip part with the large diameter.

Figure 9:
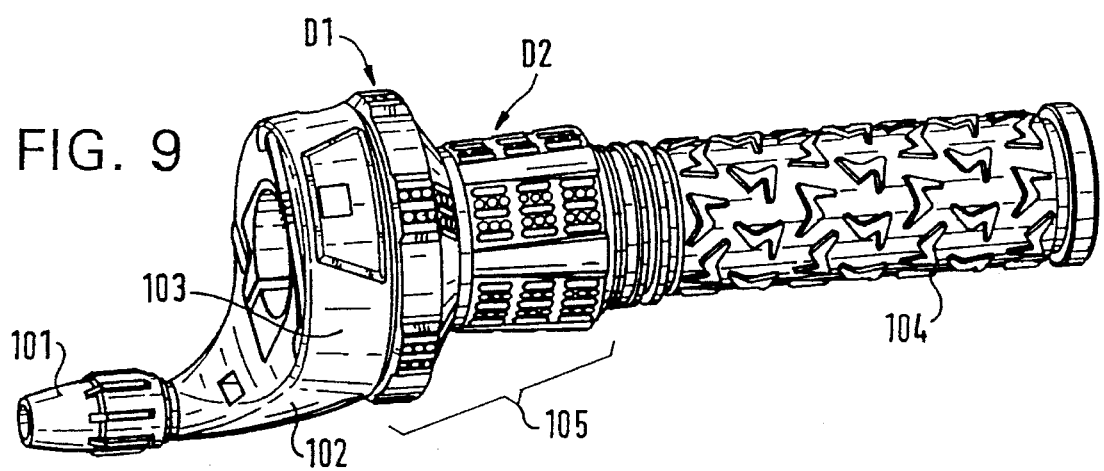
FIG. 9 shows a perspective view of a twist grip shifter with a grip part fixed to the handlebar, and a rotational grip part.

One embodiment of an invention, as shown in FIG. 9, includes a twist grip shifter with a connection for an actuator cable 101 and a cable inlet segment 102. The twist grip shifter can have a cable windup segment 103, which cable windup segment 103 can include a winding drum to wind up the actuator cable. The twist grip shifter can further include a grip part 104, which grip part 104 can be fixed to the handlebar. In addition, the twist grip shifter can include a rotational grip part 105, which rotational grip part 105 can preferably be located directly adjacent to the cable windup segment 103. The rotational grip part 105 can preferably lie between the cable windup segment 103 and the grip part 104 fixed to the handlebar.

The rotating grip part 105 can have an area with a large diameter D1 and an area with a small diameter D2. The area with the large diameter D1 of the rotational grip part 105 can be adjacent to the cable windup segment 103, and the area with the small diameter D2 can be adjacent to the grip part 104 fixed to the handlebar. The diameters on one hand of the area with the large diameter D1 and of the cable windup segment 103, and on the other hand of the grip part 104 which can be fixed to the handlebar and of the area with the small diameter D2, can be essentially approximately equal to one another. The rotating grip part 105, viewed in longitudinal section, can thus have a step-like contour, whereby the connecting line between the two areas with the diameters D1 and D2 in this contour can be described as a cone, or a radial transition similar to the one illustrated in FIG. 11.

In accordance with one embodiment of an invention the diameters of the area with the large diameter D1 and of the cable windup segment 103 can be substantially equal. Similarly, the diameters of the area with the small diameter D2 and of the grip part 104 fixed to the handlebar can be substantially equal. Additionally, the area with the large diameter D1 can include a section having the large diameter and a section which serves as a radial transition to the area with the small diameter D2. The radial transition section can preferably include a conical shape such that the smaller portion of the conical shaped section can be located adjacent the small diameter D2 and the larger portion of the conical shaped section can be located adjacent the large diameter D1. Essentially, the conical shape of the radial transition section of the area with the large diameter D1 can permit the bicyclist's hand to slide easily back and forth between the small diameter D2 and the large diameter D1.

The area with the large diameter D1 and the area with the small diameter D2, as well as the grip part 104 fixed to the handlebar, can preferably have a structured surface. The structure on the grip part 104 fixed to the handlebar preferably does not have any particular directional orientation, since essentially the only purpose of the structured surface of the grip part 104 is to provide ventilation for the cylindrical surface enclosed by the bicyclist's hand. The surface of the area with the small diameter D2 and the surface of the area with the large diameter D1, on the other hand, can preferably have a surface structure with a directional orientation, which directional orientation can preferably be parallel to the axis of rotation of the twist grip shifter, to thereby better transmit the torque applied by the rider to the rotational grip part 105.

Figure 10:
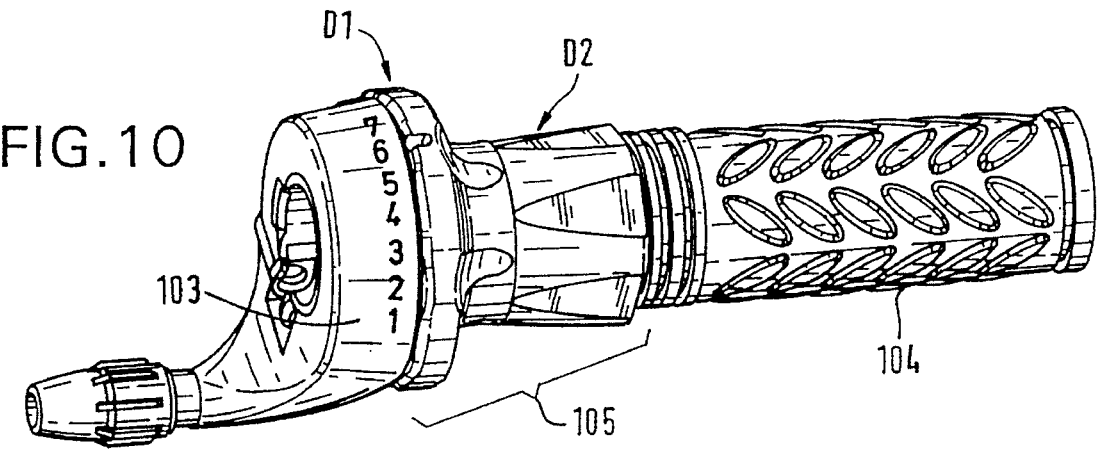
FIG. 10 shows a twist grip shifter, similar to the one shown in FIG. 9, with a variant in terms of the surface structure.

As shown in FIGS. 9 and 10, this surface structure, in particular, on the large diameter D1 can have areas which can even be sharply raised or recessed, to thereby permit an interlocking connection between the bicyclist's fingers and the rotating grip part 105, which interlocking connection can further reduce the amount of effort required to wind in the cable. The advantage of the step-like configuration of the rotating grip part 105 can be that while the bicyclist is steering the bicycle, the bicyclist's hand can surround both the non-rotational grip part 104 as well as the area of the rotational grip part 105 with the small diameter D2. When the bicyclist shifts gears, in particular, when the actuator cable is released, essentially only relatively small shifting forces can be required, whereby the bicyclist can keep his hand in essentially the same position if he actuates the rotating grip part 105 of the twist grip shifter. If, on the other hand, the actuator cable is being reeled in on the winding drum in the cable windup segment 103, larger rotational forces can typically be required. In this case, the bicyclist can then push slightly with his shifting hand toward the center of the handlebar to thereby apply a grip around the area of the rotating grip part 105 with the large diameter D1. In this manner, higher actuation forces can be exerted on the actuator cable.

In accordance with one embodiment of an invention, therefore, the small diameter D2 can be rotated to provide the small shifting forces for the release of the actuator cable. The increased diameter of the large diameter D1 can, on the other hand, provide a significant increase in the amount of force to thereby reel in the actuator cable. Furthermore, the surface of the small diameter D2 and the surface of the large diameter D1 can preferably include recessed areas and raised areas. The raised and recessed areas can preferably be oriented in a direction parallel to the axis of rotation of the rotational grip part 105, to thereby provide a frictional surface whereby the bicyclist can more easily grip and twist the rotational grip part 105. In addition, the raised and recessed areas can also essentially prevent grip slippage, especially in wet or muddy conditions.

The surface of the rotating grip part 105, in the vicinity of the large diameter D1 and in the vicinity of the small diameter D2, can preferably have a surface structure which can be directionally oriented to transmit the torque toward the axis of rotation of the twist grip shifter. The surface structure of the rotating grip part 105 can therefore essentially prevent the bicyclist's hand from slipping off. The grip part 104 fixed to the handlebar can have a surface structure with raised surface segments to provide ventilation for the contact surfaces between the bicyclist's hand and the non-rotational grip part 104.

FIG. 10 shows a variant of the twist grip shifter illustrated in FIG. 9, in which FIG. 10 the surface structures of each of the grip part 104 fixed to the handlebar, of the area with the small diameter D2 and of the large diameter D1 can be different from the surface structures of the twist grip shifter illustrated in FIG. 9. The surface structures as shown in FIG. 10 can, however, perform essentially the same function as the surface structures as shown in FIG. 9. The transition between the areas with the large diameter D1 and with the small diameter D2 can be provided, both in the embodiment illustrated in FIG. 9 and in the embodiment illustrated in FIG. 10, with a surface structure that can advantageously make it easier for the bicyclist to overcome increased torque merely by pressing his hand against this transitional area.

In summary, and in accordance with one embodiment of an invention, the amount of effort required to wind in the actuator cable can be further reduced. Thus, to reel in the actuator cable, as an alternative to twisting the large diameter D1, the radial transition section can be twisted. In other words, the area between the small diameter D2 and the large diameter D1, as shown in FIG. 10, can be twisted to thereby reel in the actuator cable. As mentioned above, when the bicyclist steers the bicycle, the bicyclist's hand can surround the non-rotational grip part 104 and the small diameter D2 of the rotational grip part 105. Thus, to twist the radial transition section, the bicyclist's hand need move only slightly away from the small diameter D2 to thereby contact and twist the radial transition section with only the inner portion of the hand, i.e. the sides of the index finger and the thumb. As a result, the bicyclist can exert less effort yet still apply a greater force to the actuator cable.

Figure 11:
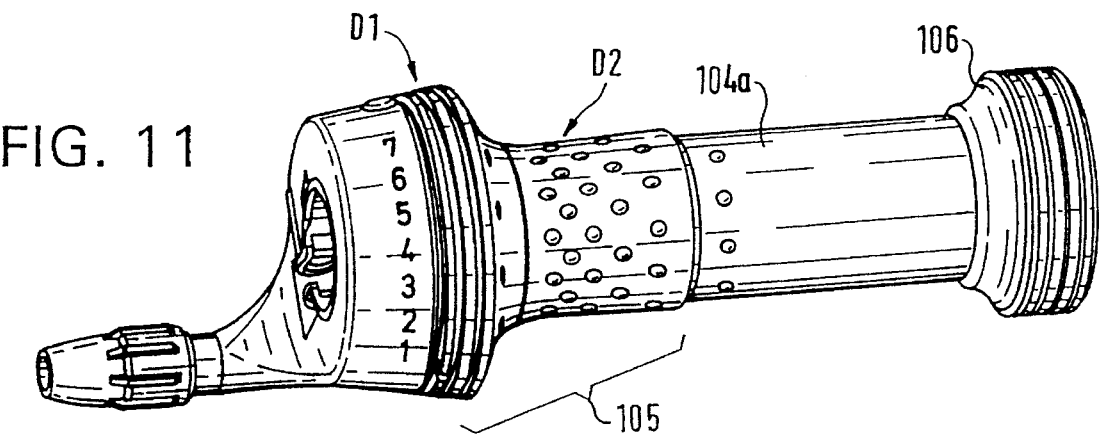
FIG. 11 shows a twist grip shifter employing the technology of the twist grip shifter illustrated in FIGS. 9 and 10, but with a ring-shaped bead on the grip part fixed to the handlebar.

FIG. 11 illustrates a twist grip shifter, whereby the grip part 104a fixed to the handlebar can have a ring-shaped bead 106, which ring-shaped bead 106 can be located on the end of the grip part 104a fixed to the handlebar. The bead 106 can, thus, coincide with the end of the handlebar, and in terms of diameter, shape and surface structure, the ring-shaped bead 106 can be essentially the same as the portion of the rotational grip part 105 provided with the large diameter D1. The advantage of the ring-shaped bead 106 lies in the enhancement of the visual appearance of the twist grip shifter, as well as in the increased safety provided for the end of the handlebar in the event of impacts, and finally in the improved guidance of the bicyclist's hand toward the end of the handlebar.

In accordance with one embodiment of an invention, the ring-shaped bead 106, as shown in FIG. 11, can be in the form of an expansion of the end of the non-rotational grip part 104a facing away from the small diameter D2 and the large diameter D1. The design, shape, and diameter of the large diameter D1 can preferably be essentially the same as the design, shape, and diameter of the ring-shaped bead 106. And although the non-rotational grip part 104a can have an essentially smooth surface, the expanded end formed by the ring-shaped bead 106 can essentially prevent the bicyclist's hand from slipping off the non-rotational grip part 104*a*.

Figure 9A:
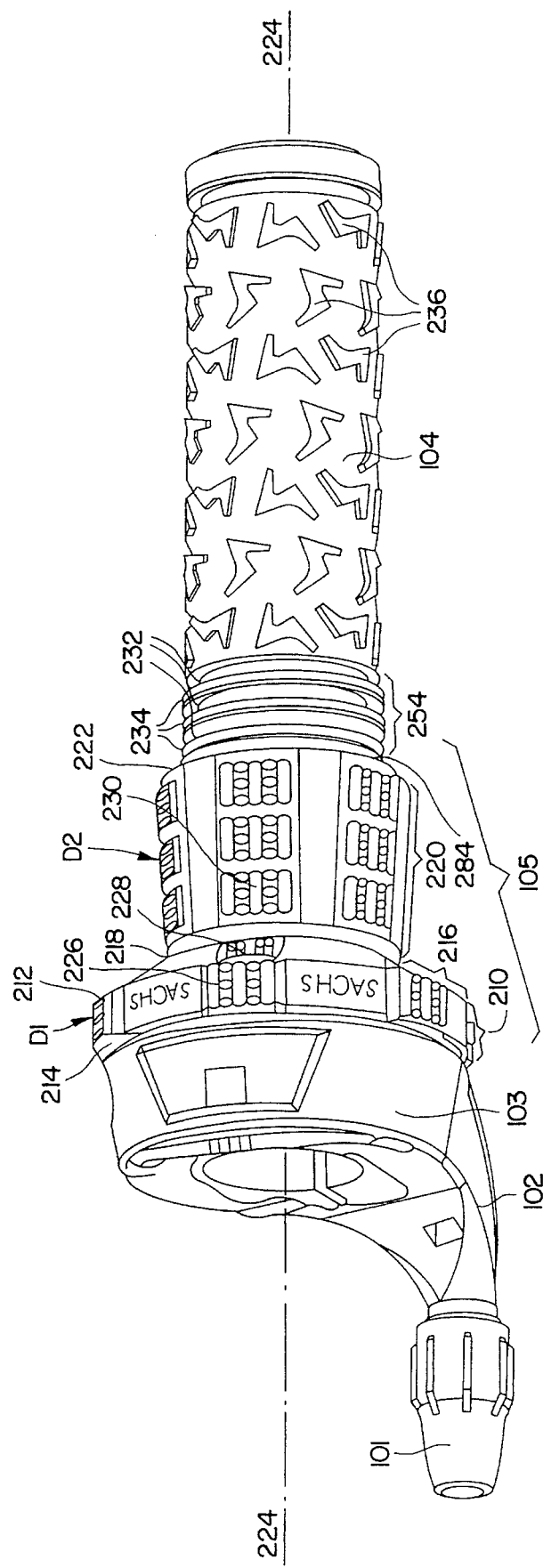
FIG. 9a shows a more detailed view of the twist grip shifter shown in FIG. 9.

In one embodiment of an invention shown in FIG. 9*a*, the larger diameter D1 can be defined by a cylinder 210. The cylinder 210 can preferably be constructed of a firm rubber-like material. The cylinder 210 can have two edges, 212 and 214. The diameter of the cylinder 210 can preferably be about 53 mm. The cylinder 210 can have an axial dimension from edge 212 to edge 214 of about 6 mm. A cylindrical conical transition area 216 can extend from edge 212 to an edge 218. The conical transition area 216 can be constructed from the same firm rubber-like material as the cylinder 210. The diameter of the conical transition area 216 at edge 218 can be about 30 mm. The axial dimension of the conical transition area 216 from edge 212 to edge 218 can be about 9 mm. The smaller diameter D2 can be defined by a conical member 220. The conical member 220 of the smaller diameter D2 can be constructed of the same firm rubber-like material as the cylinder 210 and as the conical transition area 216. The conical member 220 extends from edge 218 to an edge 222. The diameter of the conical member 220 at edge 222 can be about 33 mm. The conical member 220 can have an axial dimension from edge 218 to edge 222 of about 24 mm. The twist grip shifter can preferably have a longitudinal axial hole 224, which is disposed therethrough. The length of the axial hole 224 along the longitudinal axis can be about 56 mm. The conical transition area 216 can be angled at about 28 degrees in relation to the longitudinal axial hole 224. The conical member 220 can be angled at about 15 degrees in relation to the longitudinal axial hole 224.

The grip part 105 having the larger diameter D1 can preferably contain a repeating pattern 226. The repeating pattern 226 contains a block having a line, followed by a series of three dots, followed by a line, followed by a series of three dots, followed by a line. The lines and dots of the repeating pattern 226 can all be disposed circumferentially around the larger diameter D1. The repeating pattern 226 can be raised above the surface of the larger diameter D1. The repeating pattern 226 can be repeated approximately six times along the circumference of the larger diameter D1. The lines of the repeating pattern 226 can be disposed parallel to the longitudinal axial hole 224. The series of three dots of the repeating pattern 226 can be disposed parallel to the longitudinal axial hole 224. The parallel lines of the repeating pattern 226 can extend a longitudinal distance of about 6 mm along the axial dimension which is parallel to the longitudinal axial hole 224. The series of three dots of each repeating pattern 226 can extend a longitudinal distance of 6 mm along the axial dimension which is parallel to the longitudinal axial hole 224. Each repeating pattern 226 can extend a distance of 9 mm along the circumference of the larger diameter D1. A space of about 15 mm can be present between each repeating pattern 226. The word X-TREME or the word SACHS can be found between each repeating pattern 226. The word X-TREME and the word SACHS are raised above the surface of the larger diameter D1, and are placed in an alternating pattern between the repeating pattern 226. The word X-TREME and the word SACHS are disposed substantially perpendicular to the longitudinal axis 224. The letters in the word X-TREME and the letters in the word SACHS can extend a longitudinal distance of about 2 mm along the axial dimension of the larger diameter D1 which is parallel to the longitudinal axial hole 224. The word X-TREME can extend a distance of about 12 mm along the circumference of the larger diameter D1. The word SACHS can extend a distance of about 10 mm along the circumference of the larger diameter D1.

The conical transition area 216 can also contain a repeating pattern 228. The repeating pattern 228 contains a block having a line, followed by a series of three dots, followed by a line, followed by a series of three dots, followed by a line. The dots and lines which make up the repeating pattern 228 make an angle with respect to the longitudinal axial hole 224. The dots and lines which make up the repeating pattern 228 can be hollowed-out portions of the conical transition area 216. The repeating pattern 228 can be directly aligned with the repeating pattern 226. The repeating pattern 228 can be repeated approximately six times along the circumference of the conical transition area 216. The repeating pattern 228 can extend a distance of about 6 mm along the axial dimension of the conical transition area 216, from edge 212 to edge 218. The repeating pattern 228 can extend a distance of about 8 mm along the diameter of the conical transition area 216. A space of about 10 mm can be present between each repeating pattern 228 which is substantially adjacent to edge 218. A space of about 12 mm can be present between each repeating pattern 228 which is substantially adjacent to edge 212.

The smaller diameter D2 can preferably contain a repeating pattern 230. The repeating pattern 230 contains a block having a line, followed by a series of three dots, followed by a line, followed by a series of three dots, followed by a line. The dots and lines which make up the repeating pattern 230 can be angled with respect to the longitudinal axial hole 224. The dots and lines which make up the repeating pattern 230 can be raised. The repeating pattern 230 can be directly aligned with the repeating pattern 228. The repeating pattern 230 can be repeated approximately six times along the circumference of the smaller diameter D2. The repeating pattern 230 can be disposed along the axial length of the smaller diameter D2, and can be repeated approximately three times along the axial length of the smaller diameter D2. The repeating pattern 230 can extend down the axial length of the smaller diameter D2 a distance of about 21 mm. A space of about 6 mm is present between each repeating pattern 230 which is substantially adjacent to edge 218 and to edge 222.

The smaller diameter D2 can contain grooved indentations 232. The grooved indentations 232 can be disposed along the axial length of the smaller diameter D2. The grooved indentations 232 can be repeated approximately six times along the axial length of the smaller diameter D2. The width of each grooved indentation 232 can be about 6 mm. Each grooved indentation 232 can taper from a depth of approximately 0.5 mm at edge 222 to an area which is substantially adjacent to edge 218, and where the grooved indentation 232 is flush with the surface of the smaller diameter D2.

Further regarding FIG. 9*a*, the grip part 104 of FIG. 9*a* can extend longitudinally from the conical member 220 having the diameter D2. The grip part 104 can preferably be a stationary cylinder. The grip part 104 can contain a transition area 254. The transition area 254 contains a series of three raised bands 234 which surround the circumference of the grip part 104. The transition area 254 can preferably be located adjacent to the conical member 220 at portal 284 of the longitudinal axial hole 224, which portal 284 is substantially adjacent to edge 222. The grip part 104 contains a raised repeating pattern 236 which surrounds the circumference of the grip part 104, and which raised repeating pattern 236 is located between the transition area 254 and the end portion of the grip part 104.

Figure 10A:
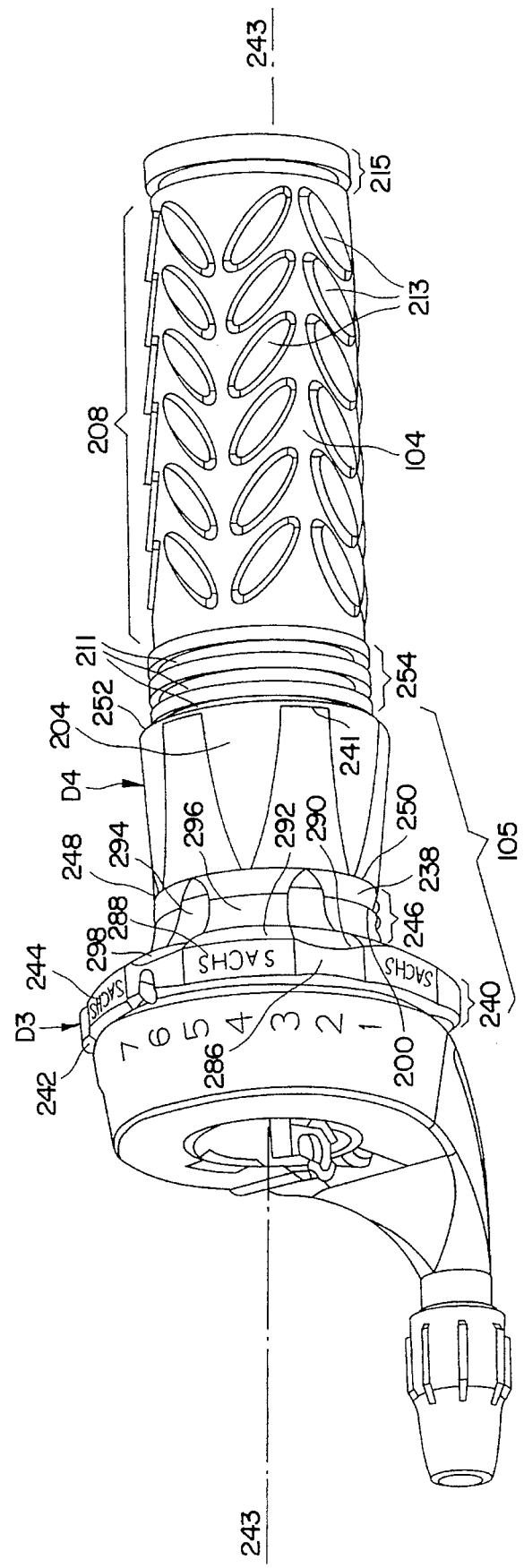
FIG. 10a shows a more detailed view of the twist grip shifter shown in FIG. 10.

FIG. 10*a* shows an alternative embodiment of a twist grip shifter. The rotational grip part 105 of the twist grip shifter of FIG. 10a contains a larger diameter D3 and a smaller diameter D4. The larger diameter D3 is defined by a cylinder 240. The cylinder 240 contains an alternating pattern of grooves 286 and flush surfaces 288, which flush surface 288 contains the word SACHS in raised letters. The grooves 286 of cylinder 240 can extend the entire axial length of cylinder 240 from an edge 242 to an edge 244. The letters in the word SACHS of flush surface 288 are disposed perpendicular to the longitudinal axial hole 243. The alternating pattern of grooves 286 and flush surfaces 288 can surround the circumference of the cylinder 240. An alternating pattern of grooves 290 and flush surfaces 292 can surround the cylinder 240 at edge 244. The grooves 290 of edge 244 can be in direct alignment with the grooves 286 of the cylinder 240.

The smaller diameter D4 can be defined by a fluted area 246. The fluted area 246 extends from edge 244 to edge 248. The fluted area 246 forms a rounded inside corner 238 of the smaller diameter D4, which rounded inside corner 238 can surround the smaller diameter D4 circumferentially. The fluted area 246 can contain an alternating pattern of grooves 294 and flush surfaces 296. The grooves 294 and flush surfaces 296 of the fluted area 246 can be disposed along the axial length of the fluted area 246, and can be in direct alignment with the grooves 290 of edge 244. The grooves 294 of the fluted area 246 taper to a point at an edge 248, where the grooves 294 of the fluted area 246 are flush with the surface of the smaller diameter D4. The fluted area 246 can also contain a band 298, which band 298 can surround the fluted area 246 circumferentially at a point approximately one-third of the axial length of the fluted area 246. Another band 200 can surround the fluted area 246 circumferentially at a point approximately two-thirds of the axial length of the fluted area 246.

The grip part 105 having the smaller diameter D4 can correspond to a conical member 250. The conical member 250 extends from edge 248 to an edge 252. The conical member 250 can contain grooved indentations 204, which grooved indentations 204 can extend along the axial length of conical member 250. The grooved indentations 204 can taper from edge 252 to a point at edge 248 where the grooved indentations 204 are flush with the surface of the smaller diameter D4. The grooved indentations 204 are preferably not in alignment with the grooved indentations 294 of the fluted area 246.

The grip part 104 of FIG. 10a extends longitudinally from the conical member 5 having a diameter D4. The grip part 104 can be a stationary cylinder 208. The grip part 104 can contain a transition area 254. The transition area 254 can contain a series of three raised bands 211 which can surround the circumference of the grip part 104. The transition area 254 can be disposed adjacent to the conical member 250 at the portal 241 of the longitudinal axial hole 243 substantially adjacent to edge 252. The grip part 104 can contain a raised repeating pattern 213 which can surround the circumference of the grip part 104. The raised repeating pattern 213 of the grip part 104 can be located between the transition area 254 and an end portion 215 of grip part 104.

Figure 10B:
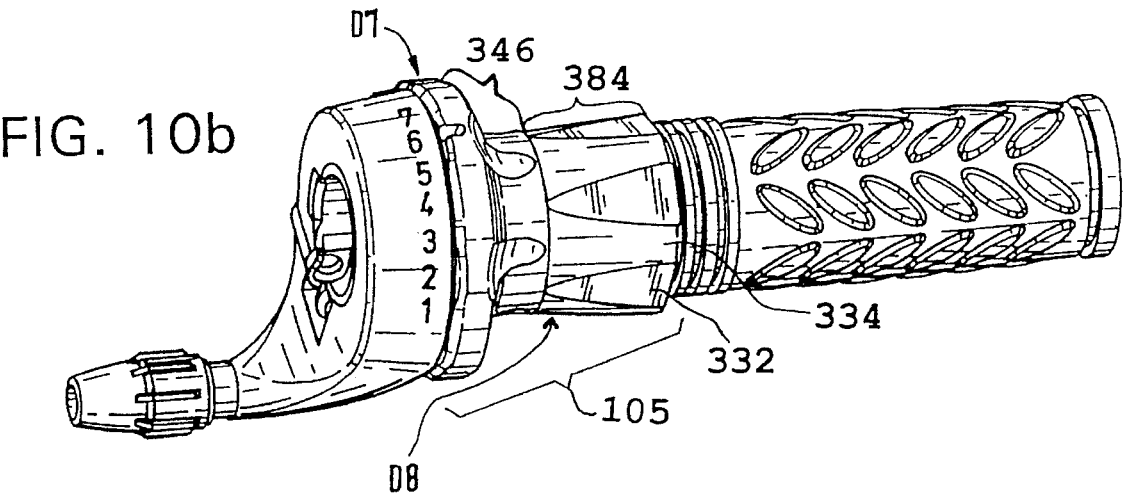

FIG. 10b shows an alternative embodiment of the twist grip shifter, which alternative embodiment is substantially similar to the embodiments shown in FIGS. 10 and 10a. FIG. 10b shows a smaller diameter D8 and a larger diameter D7 separated by the fluted area 346. The smaller diameter D8 is defined by a conical member 384. The conical member 384 contains an alternating pattern of grooves 332 and flush surfaces 334, which grooves 332 and flush surfaces 334 are disposed along the axial length of the conical member 384. The grooves 332 of the conical member 384 taper to a point approximately two-thirds of the axial length of the conical member 384, where the grooves 332 of the conical member 384 are flush with the surface of the smaller diameter D8.

One distinction between the embodiment in FIG. 10b and the embodiment in FIG. 10a is that the grooves 332 of the conical member 384 may not extend the length of the conical member 384, whereas the grooved indentations 204 of the embodiment in FIG. 10a extend the entire length of the conical member 250.

Figure 11A:
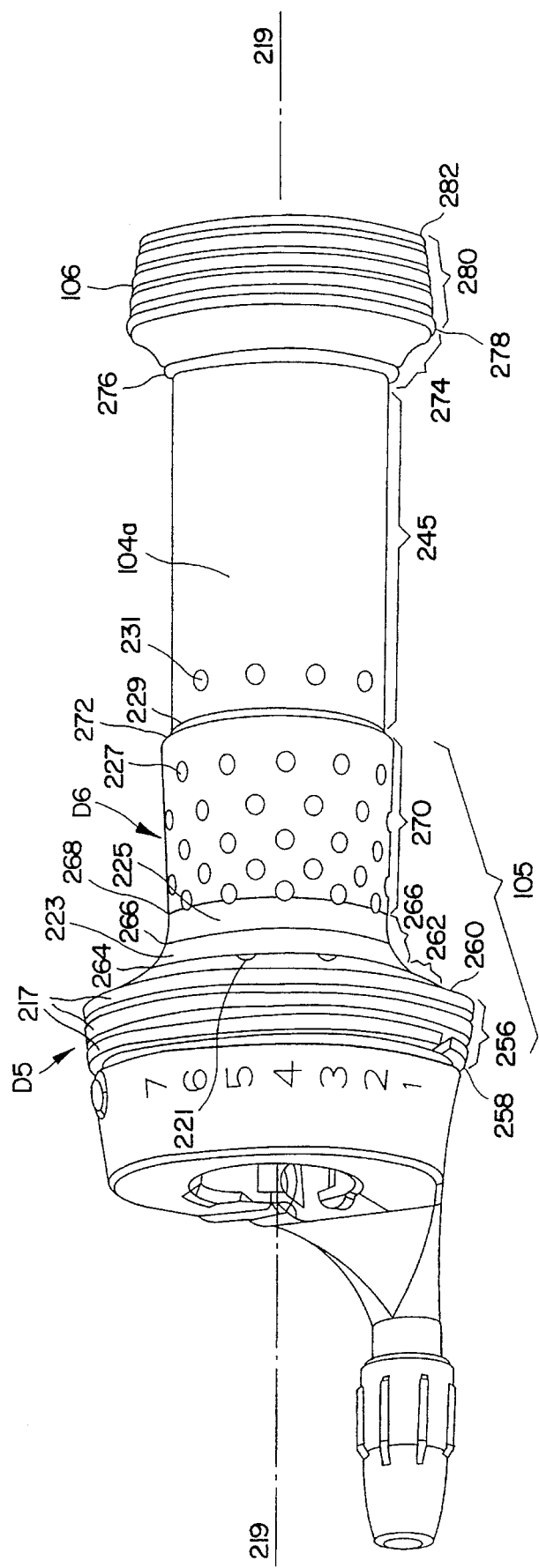
FIG. 11a shows a more detailed view of the twist grip shifter shown in FIG. 11.

FIG. 11a shows an additional embodiment of a twist grip shifter. The rotational grip part 105 of the twist grip shifter of FIG. 11a can contain a larger diameter D5 and a smaller diameter D6. The larger diameter D5 can be defined by a conical member 256. The conical member 256 can contain three bands 217 which can surround the conical member 256 circumferentially. The conical member 256 can contain an axial dimension which extends from an edge 258 to an edge 260.

A conical transition area 262 can extend from edge 260 to an edge 264. The conical transition area 262 can be disposed at an angle in relation to a longitudinal axial hole 219. A repeating pattern 221 containing a row of raised dots is disposed along the circumference of the conical transition area 262.

The smaller diameter D6 can be defined by a fluted area 266. The fluted area 266 can extend from edge 264 to an edge 268. The fluted area 266 can form a rounded inside corner 223 of the smaller diameter D6, which rounded inside corner 223 surrounds the grip part 105 having the smaller diameter D6 circumferentially. The fluted area 266 can contain a band 225, which band 225 can surround the fluted area 266 circumferentially at a point approximately half the length of the fluted area 266.

The smaller diameter D6 can be defined by a conical member 270. The conical member 270 can extend from edge 268 to an edge 272. The conical member 270 can contain a series of raised dots 227, which raised dots 227 are disposed along the axial length of the conical member 270.

The grip part 104a of FIG. 11a can extend longitudinally from the smaller diameter D6. The grip part 104a can include a stationary cylinder 245. The grip part 104a is adjacent to the smaller diameter D6 at a portal 229 of the longitudinal axial hole 219, which portal 229 is substantially adjacent to edge 272. The grip part 104a can contain a row of raised dots 231 which surround the circumference of the grip part 104a, and which row of raised dots 231 is substantially adjacent to edge 272.

FIG. 11a also shows an end collar 106. The end collar 106 can extend longitudinally from the grip part 104a. The end collar 106 can be disposed adjacent to the grip part 104a at a point substantially adjacent to an edge 276. The end collar 106 can contain a fluted area 274. The fluted area 274 can extend from edge 276 to an edge 278. The fluted area 274 can begin at a narrow point adjacent to edge 276, and can widen up to edge 278. The end collar 106 contains a member 280, which is either conical or cylindrical. The member 280 extends from edge 278 to an edge 282. The member 280 can begin at a point adjacent to edge 278, and in conical form is somewhat narrower at edge 282.

The twist grip shifter can enable the bicyclist to change gears with greater ease and reduced wrist effort. The need for greater ease and reduced wrist effort is evident during the downshifting process, when a larger shifting force must typically be exerted upon the gear mechanism. The twist grip shifter also provides a comfortable hand position, as well as reduces the chance of hand slippage while riding in a variety of weather conditions. The locus of movement necessary for the shifting process to occur is entirely within the width of the grip of the bicyclist. The firm rubber-like material which can be used to construct the twist grip shifter can allow for a greater degree of control by a bicyclist. The firm rubber-like material can also complement the larger diameter described in the embodiments as D1, D3, D5, or D7 by providing a secure, hard surface along the longitudinal length of D1, D3, D5, and D7. Such a secure, hard surface allows for the shifting process to be accomplished with greater ease. The range of pivotal movement necessary for either upshifting or downshifting is controlled by the application of pressure from the hand. The twist grip shifter permits the thumb and forefinger to rest comfortably at desired times upon an area of larger diameter described in the embodiments as D1, D3, D5, or D7. Also, the area of smaller diameter described in the embodiments as D2, D4, D6, or D8 provides a conical surface adequate for the remaining fingers to rest comfortably, and allows the shifting process to occur without the need to switch hand positions, and with little expenditure of effort. Further, as the ratio of the smaller diameter to the larger diameter is preferably in the range of 1:1.40 to 1:1.85, and more preferably 1:1.60, the thumb and forefinger may rest upon the cylindrical surface at a greater height than the smaller diameter. The greater height provides for more gripping power, and also allows the middle finger to encircle the smaller diameter at an area which effects maximal downshifting pressure with minimal effort. Additionally, the conical transition area 216 of FIG. 9a, the conical transition area 262 of FIG. 11a, and the fluted area 246 of FIG. 10a and the fluted area 346 of FIG. 10b all provide alternative gripping surfaces for the hand, which also allows for maximal shifting power with little effort. Finally, the ridged, grooved, and raised surfaces of the diameters described in all of the embodiments not only provide the necessary friction for shifting, but also may prevent hand slippage in wet or muddy conditions.

The dimensions and angles described herein are for illustrative purposes only, and may be changed in certain alternative embodiments. Further, the ratios, angles, and diameters described herein may be greater or smaller, and likewise are presented for illustrative purposes only, with possible variations forthcoming in certain alternative embodiments.

One feature of an invention resides broadly in the twist grip shifter for the control of the gears of transmissions on bicycles, comprising a connection for an actuator cable 101, a cable inlet segment 102, a winding drum in a cable windup or spooling segment 103, a grip part 104 fixed to the handlebar, a grip part 105 rotationally connected to the winding drum, characterized by the fact that the contour of the rotational grip part 105 is designed in a stepped fashion, and has essentially an area with a large diameter D1 and an area with a small diameter D2, whereby the area with the large diameter D1 is adjacent to the cable windup segment 103 and the area with the small diameter D2 is directed toward the grip part 104 which is fixed to the handlebar, and the area with the small diameter D2 has a diameter which differs only slightly from that of the grip part 104.

Another feature of an invention resides broadly in the twist grip shifter characterized by the fact that the surface of the non-rotational grip part 104 has a first, nondirectionally-structured surface profile for ventilation.

Yet another feature of an invention resides broadly in the twist grip shifter characterized by the fact that the surface of the rotational grip part 105 has a directional surface profile both in the vicinity of the large diameter D1 and in the vicinity of the small diameter D2 for the transmission of torque.

Still another feature of an invention resides broadly in the twist grip shifter characterized by the fact that the area with the small diameter D2 of the rotational grip part 105 can vary slightly, resulting in a rotationally symmetrical shape which is different from a cylindrical shape.

A further feature of an invention resides broadly in the twist grip shifter characterized by the fact that the rotational grip part 105 has a conical shape in the vicinity of the small diameter D2.

Another feature of an invention resides broadly in the twist grip shifter characterized by the fact that the rotational grip part 105 has its smallest diameter at the point of the transition from the area with the small diameter D2 to the area with the large diameter D1.

Yet another feature of an invention resides broadly in the twist grip shifter characterized by the fact that, at the end of the handlebar, the grip part 104a fixed to the handlebar has a ring-shaped bead 106, the shape of which is identical, in terms of diameter, shape and surface structure, to the area of the rotational grip part 105 with the large diameter D1.

Figure 12:
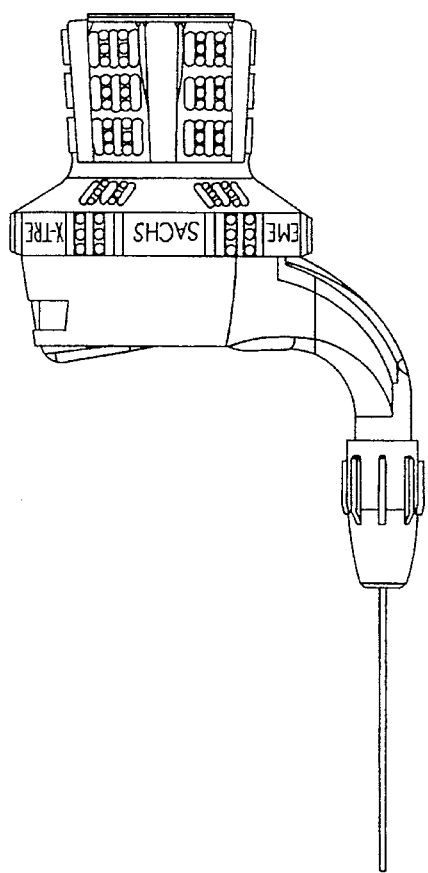
FIG. 12 shows a complete twist grip shifter assembly.
Figure 13:
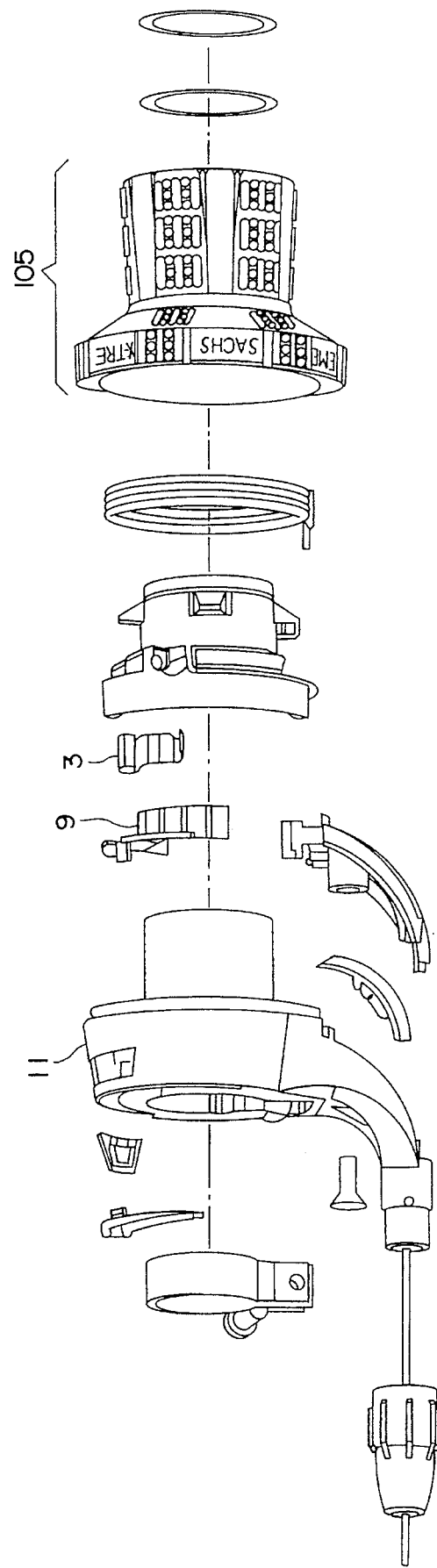
FIG. 13 shows an exploded view of the twist grip shifter assembly shown in FIG. 12.

FIG. 12 shows a complete twist grip shifter assembly. FIG. 13 shows the assembly in an exploded view. The exploded view shows the spatial relationship of the various components of the assembly as they would appear in an embodiment of the present invention. FIG. 13 shows the internal components: the slide 9 and the detent spring 3, and how they are positioned with respect to each other. The detent spring 3 rests on the slide 9 as it is positioned within the housing 11. Also, FIG. 13 shows the rotational grip part 105 which surrounds the internal components and joins the housing 11.

Figure 14:
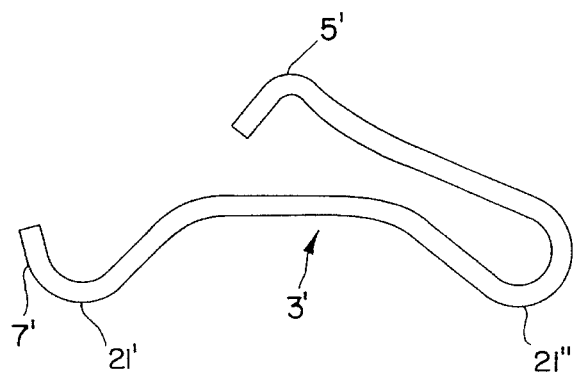
FIGS. 14 and 15 show two different aspects of one embodiment of the detent spring.
Figure 15:
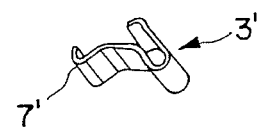

FIGS. 14 and 15 show two different aspects of one embodiment of the detent spring 3'. The aspects shown in FIGS. 14 and 15 are of a variant of the detent spring 3' as shown in FIG. 5. The detent spring 3' shown in FIGS. 14 and 15 does not have the notch 7" as shown in FIG. 5, but it does illustrate the joining of the detent spring 3' and the transition spring 7' as they would appear in a band steel embodiment.

Figure 16:
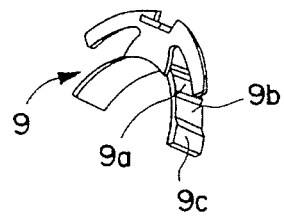
FIGS. 16, 17 and 18 show various aspects of one embodiment of the slide.
Figure 17:
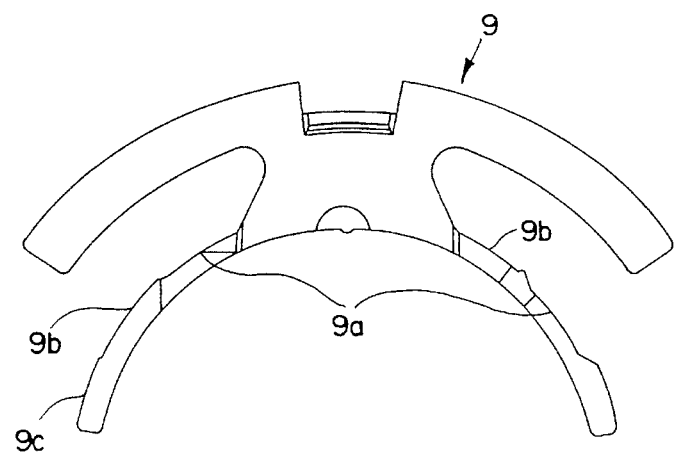
Figure 18:
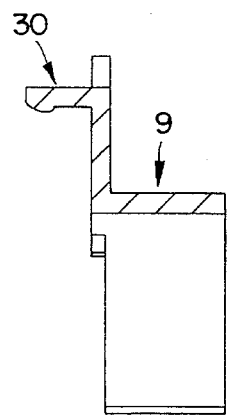
Figure 19:
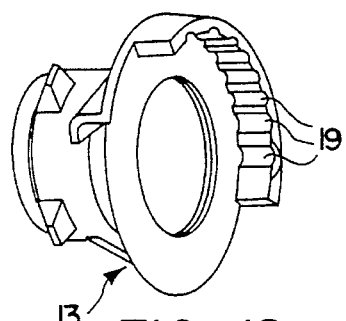
FIGS. 19, 20, 21, 22, and 23 show various aspects of one embodiment of the detent element.
Figure 20:
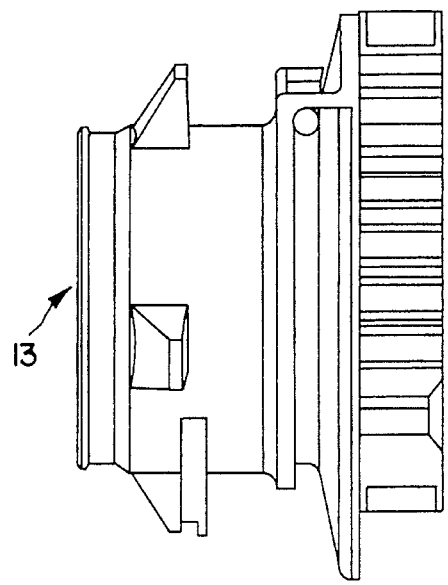
Figure 21:
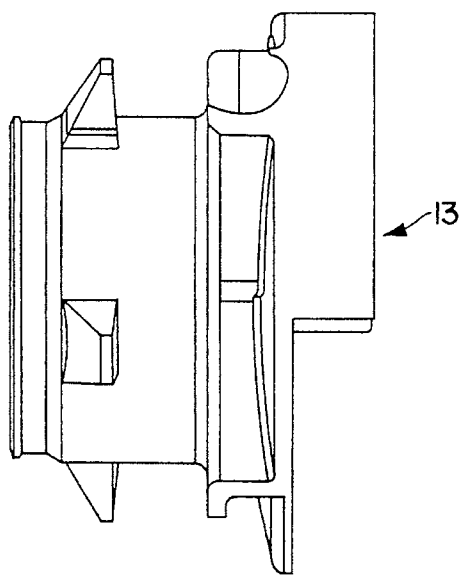
Figure 22:
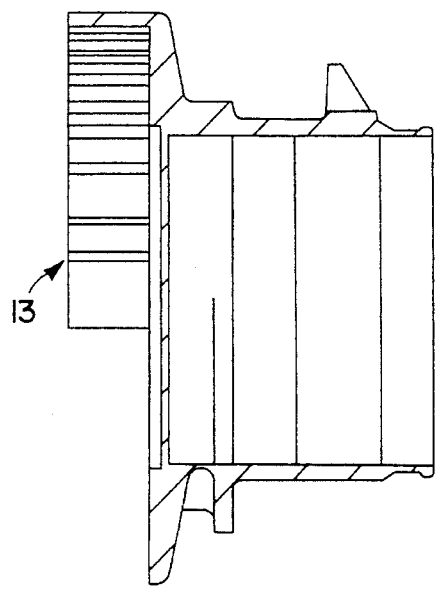
Figure 23:
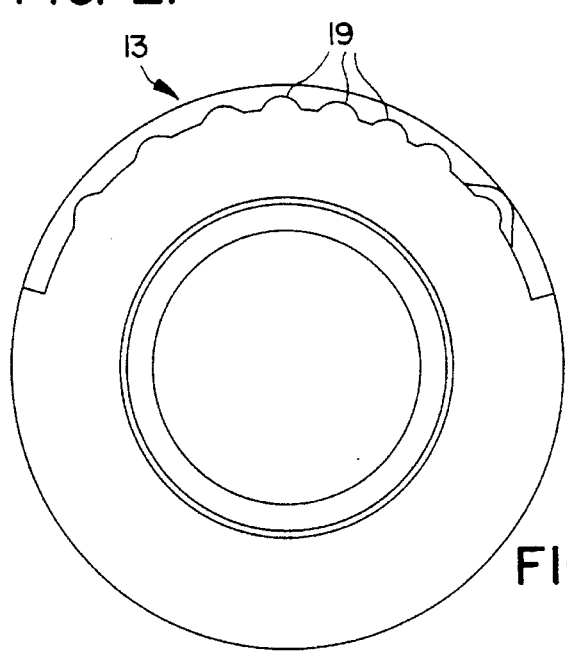

FIGS. 16, 17 and 18 show various aspects of one embodiment of the slide 9. The views shown in these FIGS. 16 and 17 provide different angles which show the bias stages 9a, 9b, and 9c. The FIGS. 16, 17 and 18 show the joining tang 30 which connects the slide 9 through an opening in the housing 11 to the user operated control that is used to reposition the slide 9 and thus to tune the bias to the user's preference.

FIGS. 19, 20, 21, 22 and 23 show various aspects of one embodiment of the detent element 13. The views shown present the parts of the detent element main body that interfaces with the rotational grip part 105. The various connecting prongs may be used to facilitate the user's selection of gear. Also, the FIGS. 19 and 23 clearly show the detent 19 positions that the lug 5 could rest in to restrain the actuator cable.

The components disclosed in the various publications, disclosed or incorporated by reference herein, may be used in the embodiments of the present invention, as well as, equivalents thereof.

Examples of bicycle shifting mechanisms which may be utilized in accordance with the embodiments of the present invention, may be disclosed in the following U.S. Pat. Nos. 4,900,291, which issued to Patterson on Feb. 13, 1990, entitled "Bicycle Gear Shifting Method and Apparatus"; No.

4,938,733, which issued to Patterson on Jul. 3, 1990, entitled "Bicycle Gear Shifting Method and Apparatus"; No. 5,009,629, which issued to Tagawa on Apr. 23, 1991, entitled "Shift Lever Assembly for Bicycle"; No. 5,102,372, which issued to Patterson et al on Apr. 7, 1992, entitled "Bicycle Derailleur Cable Actuating System"; No. 5,135,441, which issued to Gelbien on Aug. 4, 1992, entitled "Shifting Apparatus for Multispeed Bicycles"; No. 5,178,033, which issued to Kund on Jan. 12, 1993, entitled "Bicycle Gear Display"; No. 5,186,071, which issued to Iwasaki on Feb. 16, 1993, entitled "Bicycle Speed Change Lever Assembly"; No. 5,186,072, which issued to Nagano on Feb. 16, 1993, entitled "Bicycle Speed Control System for Controlling a Change Speed Devise Through a Change Speed Wire"; No. 5,191,807, which issued to Hsu on Mar. 9, 1993, entitled "Indexed Gear-Shift Mechanism"; No. 5,197,927, which issued to Patterson et al on Mar. 30, 1993, entitled "Bicycle Derailleur Cable Actuating System"; No. 5,205,794, which issued to Browning on Apr. 27, 1993, entitled "Shift Mechanism for Bicycle"; No. 5,213,005, which issued to Nagano on May 25, 1993, entitled "Speed Control Devise for Bicycle Derailleur"; No. 5,241,878, which issued to Nagano on Sep. 7, 1993, entitled "Bicycle Control Devise"; No. 5,287,766, which issued to Nagano on Feb. 22, 1994, entitled "Speed Control Apparatus for a Bicycle"; No. 5,303,608, which issued to Iwasaki on Apr. 19, 1994, entitled "Bicycle Speed Change Lever Assembly"; No. 5,315,891, which issued to Tagawa on May 31, 1994, entitled "Bicycle Speed Change Operation Assembly"; No. 5,322,487, which issued to Nagano on Jun. 21, 1994, entitled "Self-Contained Change Speed Apparatus with Shaped Pawls to Equalize a Shifting Force for a Bicycle"; No. 5,325,735, which issued to Nagano on Jul. 5, 1994, entitled "Bicycle Speed Control Apparatus Having a Speed Indicator"; No. 5,354,240, which issued to Hunter, Jr. on Oct. 11, 1994, entitled "Variable Transmission"; No. 5,355,745, which issued to Wu and Hsuan on Oct. 18, 1994, entitled "Bicycle Speed Controller"; and No. 5,361,645, which issued to Feng and Kang on Nov. 8, 1994, entitled "Shift Lever Apparatus for Use in Bicycle".

Some examples of latching shifters which may be used in accordance with the embodiments of the present invention, may be disclosed in the following U.S. Pat. Nos. 5,421,219 entitled "Bicycle Speed Change System, Bicycle Speed Change Method and Bicycle Speed Change Operation Assembly" to Maeda and Bridgestone; No. 5,390,565 entitled "Bicycle Speed Change System, Bicycle Speed Change Method and Bicycle Speed Change Operation Assembly" to Maeda and Bridgestone; No. 5,315,891 entitled "Bicycle Speed Change Operation Assembly" to Maeda; and No. 5,241,877 entitled "Gear Selector" issued Sep. 7, 1993.

Some examples of latching shifters which may be used in accordance with the embodiments of the present invention, may be disclosed in the following Federal Republic of Germany Patents: No. DE 32 15 426 A1 to Fichtel & Sachs and No. DE 38 23 741 A1 to Shimano.

An additional example of latching shifters which may be used in accordance with the embodiments of the present invention, may be found in French Patent No. 2 540 818.

Some examples of Twist grip shifters which may be used in accordance with the embodiments of the present invention, may be disclosed in the following U.S. Pat. Nos. 3,218,879 entitled "Twist Grip Controls" to Raleigh; No. 5,134,897 entitled "Twist-grip Device for Operating the Gears of a Bicycle" to Campagnolo; No. 4,938,733 entitled "Bicycle Gear Shifting Method and Apparatus" to Sram Corporation; and No. 4,900,291 entitled "Bicycle Gear Shifting Method and Apparatus" to Sram Corporation.

Additional examples of Twist grip shifters and related components which may be used in accordance with the embodiments of the present invention, may be disclosed in the following Federal Republic of Germany Patents: No. DE 32 15 427 A1 to Fichtel & Sachs and No. DE 37 27 933 A1.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. P 44 42 952.5, filed on Dec. 2, 1994, having inventors Markus Arbeiter and Christian Weishaupt, and DE-OS P 44 42 952.5 and DE-PS P 44 42 952.5, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The corresponding foreign patent publication applications, namely, Federal Republic of Germany Patent Application No. P 44 42 953.3, filed on Dec. 2, 1994, having inventor Markus Arbeiter, and DE-OS P 44 42 953.3 and DE-PS P 44 42 953.3, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The corresponding foreign patent publication applications, namely, Federal Republic of Germany Patent Application No. 295 07 220.2, filed on Apr. 29, 1995, having inventor Klaus Neumann, and DE-OS 295 07 220.2 and DE-PS 295 07 220.2, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. Shifter for a derailleur for bicycles, comprising a housing, a detent element which is connected both to a manual actuator and to the derailleur, as well as a detent spring made of elastic plastic material, a lug of which interacts with detents of the detent element and can have a transition distance between the housing and the detent spring, wherein the detent spring is located in a recess of the housing, whereby also located in the recess, in addition to the detent spring, located downstream in the direction of movement, is a transition spring which can apply a bias between the housing and the detent spring and can be compressed into a block.

2. Shifter as claimed in claim 1, wherein that the spring travel of the transition spring corresponds to a specified transition distance on the derailleur.

3. Shifter as claimed in claim 1, wherein that the transition spring is connected in one piece with the detent spring.

4. Shifter as claimed in claim 3, wherein that the detent spring has a stop which limits a transition distance by interaction with the transition spring.

5. Shifter as claimed in claim 1, wherein that the transition spring is realized in the form of a plate spring.

6. Shifter as claimed in claim 1, wherein that the transition spring is realized in the form of a coil spring.

7. Shifter for a derailleur for bicycles, comprising a housing, a detent element which is connected both to a manual actuator and to the derailleur, as well as a detent spring, a lug of which interacts with detents of the detent element and can have a transition distance between the housing and the detent spring, wherein that the detent spring is located in a recess of the housing, whereby also located in the recess, downstream of the detent spring in the direction of movement, there is a transition spring which is connected in one piece with the detent spring, and which can apply a bias between the housing and the detent spring.

8. Shifter as claimed in claim 7, wherein that the detent spring is made of steel band material.

* * * * *